(12) United States Patent
Mao et al.

(10) Patent No.: US 8,867,016 B2
(45) Date of Patent: Oct. 21, 2014

(54) WAVELENGTH SELECTIVE SWITCH

(75) Inventors: Hongwei Mao, Fremont, CA (US); Lifu Gong, San Jose, CA (US); Tian Zhu, Castro Valley, CA (US); Jian Liu, Fremont, CA (US)

(73) Assignee: Oplink Communications, Inc., Fremont, CA (US)

( * ) Notice: Subject to any disclaimer, the term of this patent is extended or adjusted under 35 U.S.C. 154(b) by 187 days.

(21) Appl. No.: 13/418,274

(22) Filed: Mar. 12, 2012

(65) Prior Publication Data

US 2013/0235283 A1    Sep. 12, 2013

(51) Int. Cl.
*G02F 1/13* (2006.01)

(52) U.S. Cl.
USPC .......................................... 349/196; 349/202

(58) Field of Classification Search
CPC ............... G02B 6/356; G02B 6/29313; G02B 6/29311; G02B 6/3512; G02B 6/272; G02B 6/3548; G02B 6/3518; G02B 6/3594; G02B 6/29383; G02B 6/2773; G02B 6/3546; G02B 6/2766; G02B 6/278; G02B 6/29314; G02B 6/29394; G02B 6/3516; G02B 6/0833; G02B 6/29302; G02B 6/29373; G02B 6/4215; G02B 6/4246; G02B 6/29308; G02B 6/29353; G02B 6/3514; G02B 6/352; G02B 6/3524; G02B 6/3528; G02B 6/3558; G02B 6/3566; G02B 27/1006; G02B 27/1086; G02B 27/123; G02B 27/106; G02B 27/283; G02B 27/30; G02B 27/4224; G02B 2006/12104; G02B 2006/1215; G02B 5/18; G02B 5/1814; G02B 5/1828; G02B 5/1861; H04J 14/0212; H04J 14/02; H04J 14/0213; H04J 14/021; H04J 14/0205; H04J 14/0201; H04J 14/0206; H04J 14/0208; H04J 14/06; H04Q 11/0005; H04Q 11/0001; H04Q 11/0003; H04Q 2011/0009; H04Q 2011/0016; H01S 3/0675; H01S 3/2383; H01S 3/08059; H01S 3/06712; H01S 5/141; H01S 5/1085; G02F 1/31; G02F 1/133528; G02F 1/011; G02F 1/0311; G02F 1/1326; G02F 1/29; G02F 1/292; G02F 1/295; G02F 1/313; G02F 1/3501; G02F 1/365; G02F 2001/3507; G02F 2201/307; G02F 2201/34; G02F 2203/58; G02F 2203/585; G01J 3/021; G01J 3/0208; G01J 3/0218; G01J 5/0834; G01N 2021/6419; G01N 2021/0636

USPC ............ 349/1, 8, 9, 196, 197, 201, 202, 113; 359/238, 298, 223.1, 484.06, 259, 263, 359/301, 303, 304, 320, 487.04, 489.05, 359/489.06, 489.08, 489.15, 569, 636, 641, 359/855; 356/326; 385/18, 11, 16, 24, 37, 385/17, 15, 27, 33, 3, 31, 36; 398/79, 48, 398/34, 183, 49, 65, 83, 87; 372/26, 99

See application file for complete search history.

(56) References Cited

U.S. PATENT DOCUMENTS

| | | | |
|---|---|---|---|
| 6,285,500 B1 | 9/2001 | Ranalli et al. | |
| 6,810,169 B2 | 10/2004 | Bouevitch | |
| 6,947,628 B1 | 9/2005 | Peng et al. | |
| 7,454,100 B2 * | 11/2008 | Corem et al. | 385/18 |
| 7,468,840 B2 | 12/2008 | Cohen et al. | |
| 7,492,986 B1 | 2/2009 | Kelly | |
| 7,822,303 B2 * | 10/2010 | Cohen et al. | 385/18 |

FOREIGN PATENT DOCUMENTS

| | | |
|---|---|---|
| WO | WO94/28456 | 12/1994 |
| WO | WO2007/029260 | 3/2007 |
| WO | WO2010/146589 | 12/2010 |

OTHER PUBLICATIONS

European Search Report dtd. May 8, 2013 from Application No. 12178743.6, pp. 1-4.
Communication in European Application No. 12 178 743.6, mailed May 16, 2013, 10 pages.

* cited by examiner

Primary Examiner — Thoi Duong
(74) *Attorney, Agent, or Firm* — Fish & Richardson P.C.

(57) ABSTRACT

Methods, systems, and apparatus, for optical switching. In one aspect, a wavelength selective switch includes one or more optical input ports; one or more optical output ports; a first optical wavelength dispersion element configured to separate the plurality of wavelength channels of the input optical beam; a second optical wavelength dispersion element configured to combine two or more separate optical beams each having one or more different wavelengths, into a combined beam having the plurality of wavelength channels; a polarization modulator array configured to independently change a polarization orientation of an optical beam passing through; optical components for directing optical beams corresponding to respective wavelength channels to different polarizing modulation cells; and a polarization beam splitter configured to route received optical beams to particular output paths according to polarization orientation.

15 Claims, 4 Drawing Sheets

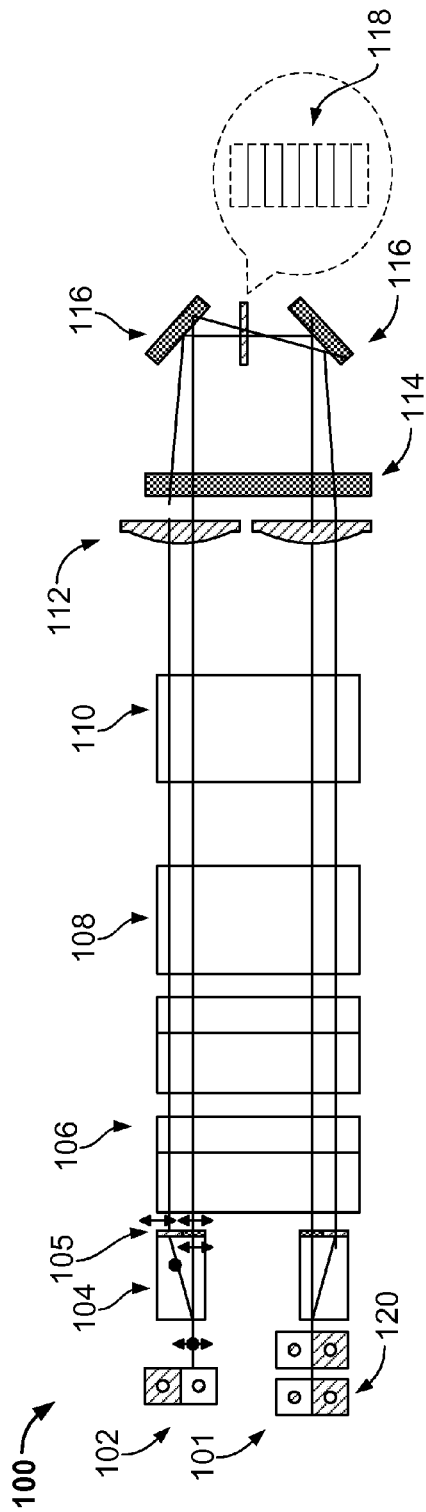
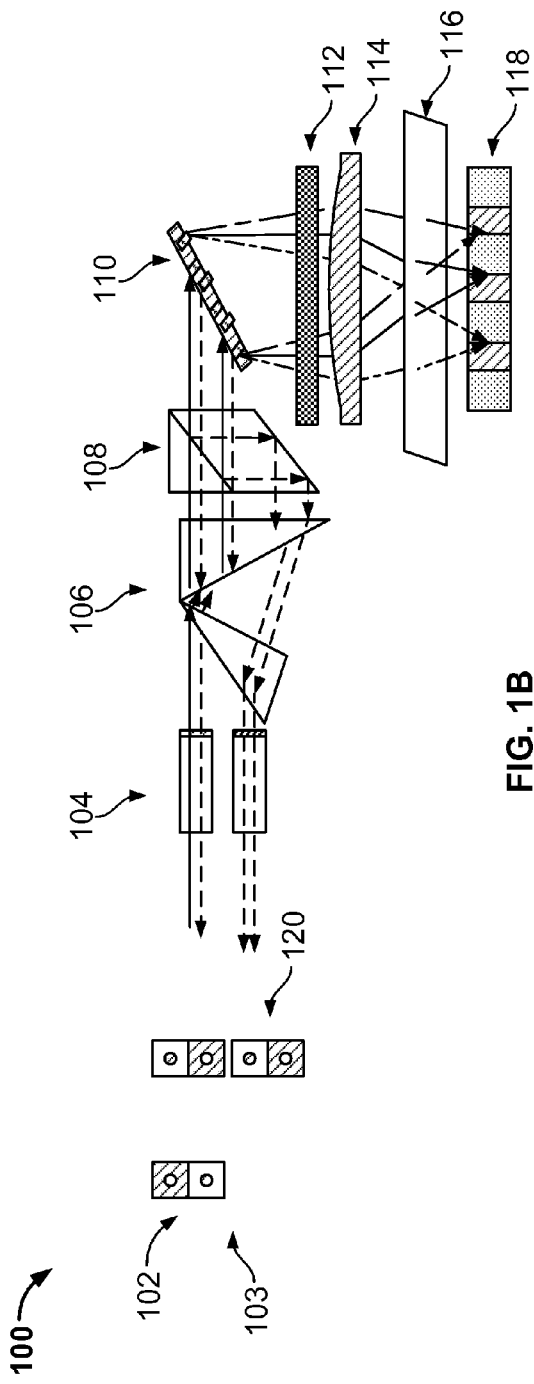
FIG. 1A
FIG. 1B

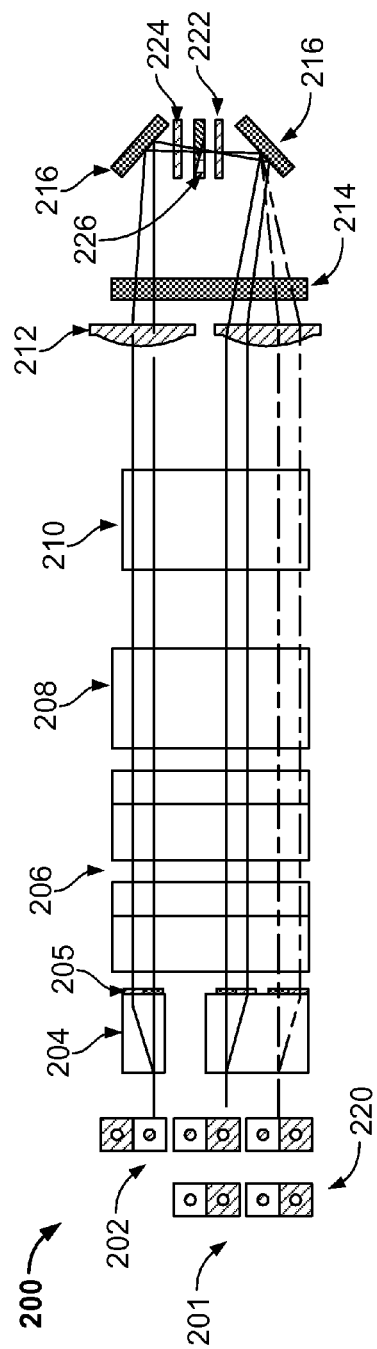
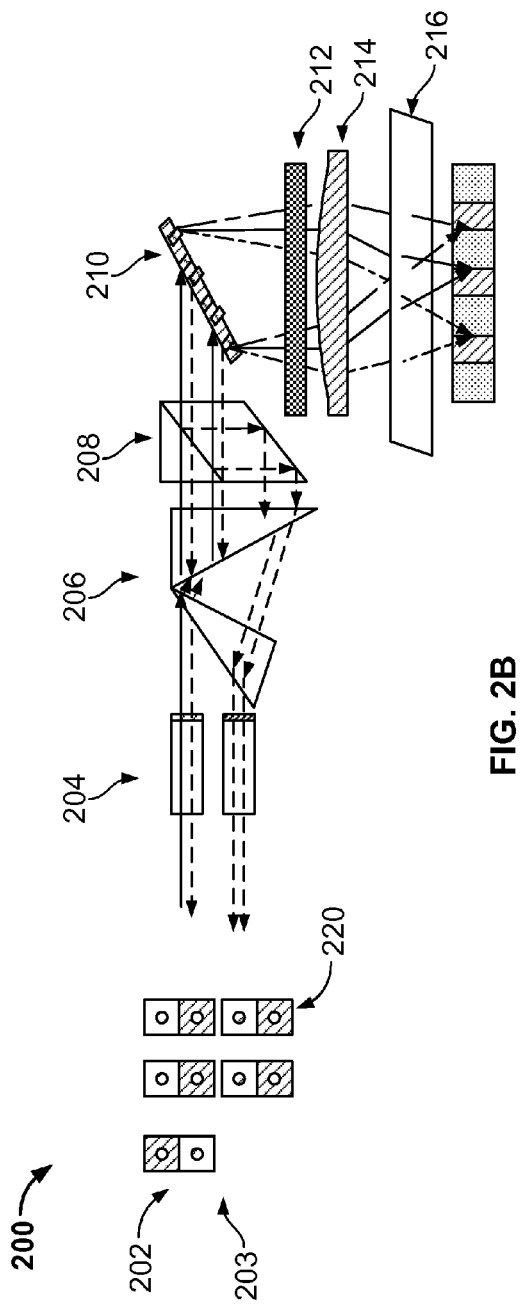
FIG. 2A
FIG. 2B

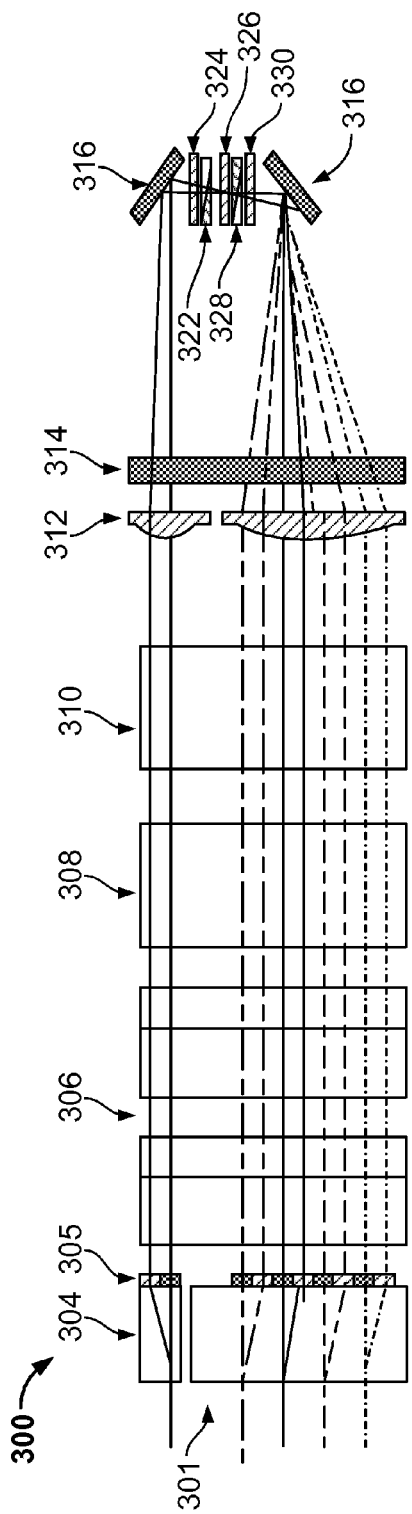
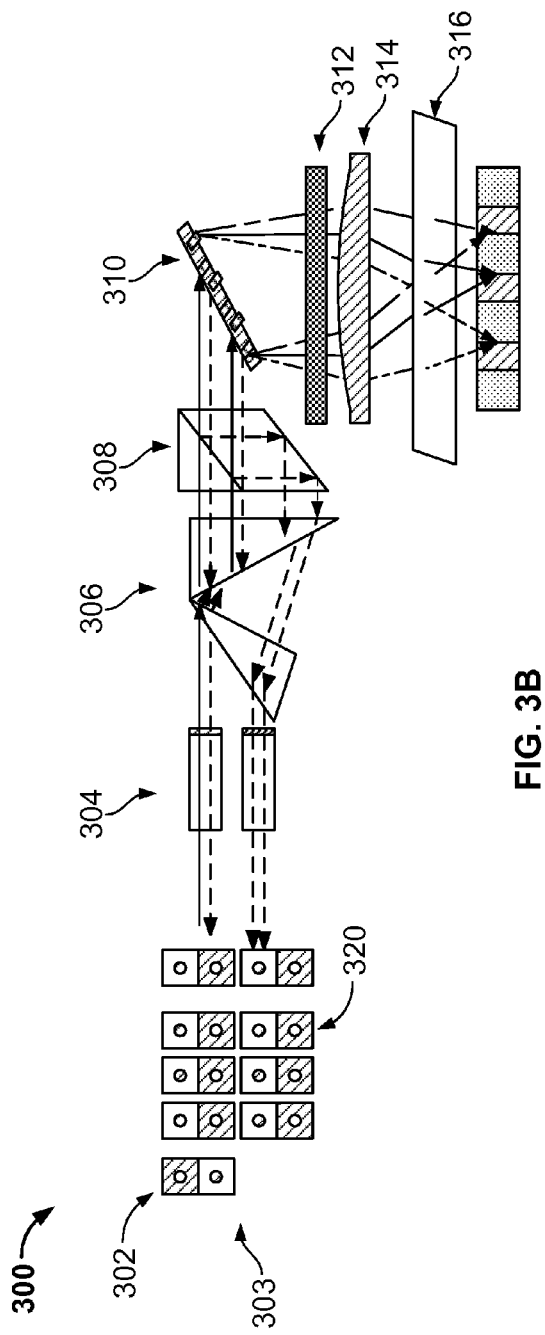
FIG. 3A
FIG. 3B

WAVELENGTH SELECTIVE SWITCH

BACKGROUND

This specification relates to optical technology.

Optical switches are typically used in optical communication systems. An optical switch is a switch that enables optical signals in, e.g., optical fibers, to be selectively switched from one optical fiber to another. A conventional wavelength switch is typically used for wavelength multiplexing/demultiplexing of wavelength division multiplexed ("WDM") optical signals and includes structures for switching optical signals on a per-wavelength basis

SUMMARY

This specification describes technologies relating to optical switching. A wavelength selective switch is provided that uses polarization switching to change a polarization for specified wavelengths and then uses beam separation to route the wavelengths to specific output ports.

In particular, the wavelength selective switch separates different wavelength channels from an optical beam using a grating such that different wavelengths will be incident upon a switch, e.g., a liquid crystal polarization switch. Each wavelength is targeted to a separate cell, e.g., a particular pixel, of the switch. Depending on the settings for each cell, the polarization of the different wavelengths can each be changed or remain the same. The wavelength channels are merged into an output optical beam that is then separated according to polarization to provide port routing, directing particular wavelengths to particular output ports. Wavelength channels are routed to particular output ports based on their beam path and polarization. Switching according to wavelength channels can be performed, for example, in wavelength division multiplexing or demultiplexing applications.

In general, one innovative aspect of the subject matter described in this specification can be embodied in a wavelength selective switch that includes one or more optical input ports configured to receive one or more input optical beams the one or more input optical beams having a plurality of wavelength channels; one or more optical output ports, each of the one or more output optical ports being configured to receive one or more wavelength channels of the plurality of wavelength channels; a first optical wavelength dispersion element configured to separate the plurality of wavelength channels of the input optical beam; a second optical wavelength dispersion element configured to combine two or more separate optical beams each having one or more different wavelengths, into a combined beam having the plurality of wavelength channels; a polarization modulator array having a plurality of polarizing modulation cells, each cell configured to independently change a polarization orientation of an optical beam passing through the cell; one or more optical components for directing optical beams corresponding to respective wavelength channels to different polarizing modulation cells; and a polarization beam splitter configured to route received optical beams to particular output paths according to polarization orientation.

The foregoing and other embodiments can each optionally include one or more of the following features, alone or in combination. The polarization beam splitter is positioned between the second optical wavelength dispersion element and the one or more optical output ports. The polarization modulator array is positioned between the first optical wavelength dispersion element and the second optical wavelength dispersion element. The wavelength selective switch further includes polarization conditioning components configured to condition the input optical beam such that the one or more input optical beams have a uniform polarization orientation. The wavelength selective switch further includes one or more beam expanding components positioned between the one or more optical input ports and the first optical wavelength dispersion element. The polarization modulator array is a liquid crystal cell array. The polarization modulator array is a thin film transistor liquid crystal panel or a liquid crystal on silicon. The one or more optical components include one or more focusing lenses positioned between the first optical wavelength dispersion element and the polarization modulator array, wherein at least one of the one or more focusing lenses focuses the particular wavelengths on respective pixels of the polarization modulator array. The polarization beam splitter is a thin film coated polarization selective prism, birefringence crystal walk off block, or birefringence crystal prism. The wavelength selective switch further includes one or more beam expanding component positioned between the one or more optical input ports and the first optical wavelength dispersion element.

The wavelength selective switch is a 1×2 switch having 1 optical input port and two optical output ports. The wavelength selective switch is a 1×n switch having 1 optical input port and n optical output ports. The wavelength selective switch is a 2×1 switch having 2 optical input ports and 1 optical output port. The wavelength selective switch is an n×1 switch having n input optical ports and 1 output optical port. The polarization modulator array is positioned at a back end of the wavelength selective switch and the polarization beam splitter is positioned at a front end of the wavelength selective switch.

In general, one innovative aspect of the subject matter described in this specification can be embodied in a wavelength selective switch that includes one or more optical input ports configured to receive one or more input optical beams, the one or more input optical beams having a plurality of wavelength channels; one or more optical output ports, of the one or more output optical ports being configured to receive one or more wavelength channels of the plurality of wavelength channels; a first optical wavelength dispersion element configured to separate the plurality of wavelength channels of the one or more input optical beams; a second optical wavelength dispersion element configured to combine two or more separate optical beams each having one or more different wavelengths, into a combined beam having the plurality of wavelength channels; a polarization modulator array having a plurality of polarizing modulation cells, each cell configured to independently change a polarization orientation of an optical beam passing through the cell; one or more optical components for directing optical beams corresponding to respective wavelength channels to different polarizing modulation cells; a polarization beam splitter configured to route received optical beams with different polarization to particular output paths; and one or more switch pairs, each switch pair including a second polarization modulator array and a birefringence element, each switch pair providing a separation angle between two specified polarization orientations.

The foregoing and other embodiments can each optionally include one or more of the following features, alone or in combination. The polarization beam splitter is positioned between the second optical wavelength dispersion element and the one or more optical output ports. The polarization modulator array is positioned between the first optical wavelength dispersion element and the second optical wavelength dispersion element. The wavelength selective switch further includes polarization conditioning components configured to condition the one or more input optical beam such that the one or more input optical beam has a uniform polarization orientation. The wavelength selective switch further includes one or more beam expanding components positioned between the one or more optical input ports and the first optical wavelength dispersion element. The polarization modulator array is a liquid crystal cell array. The polarization modulator array is a thin film transistor liquid crystal panel or a liquid crystal on silicon. The one or more optical components include one or more focusing lenses positioned between the first optical wavelength dispersion element and the polarization modulator array, wherein at least one of the one or more focusing lenses focuses the particular wavelengths on respective pixels of the polarization modulator array. The polarization beam splitter is a thin film coated polarization selective prism, birefringence crystal walk off block, or birefringence crystal prism. The wavelength selective switch further includes one or more beam expanding component positioned between the one or more optical input ports and the first optical wavelength dispersion element. The wavelength selective switch is a 1×2 switch having 1 optical input port and two optical output ports. The wavelength selective switch is a 1×n switch having 1 optical input port and n optical output ports. The wavelength selective switch is a 2×1 switch having 2 optical input ports and 1 optical output port. The wavelength selective switch is an n×1 switch having n input optical ports and 1 output optical port. The polarization modulator array is positioned at a back end of the wavelength selective switch and the polarization beam splitter is positioned at a front end of the wavelength selective switch. The number of output optical ports or number of input optical ports N depends on the number of switch pairs M such that $N=2^{(M+1)}$.

In general, one innovative aspect of the subject matter described in this specification can be embodied in methods that include the actions of receiving an optical beam, the optical beam including a plurality of wavelengths and wherein each wavelength has the same polarization direction; separating the optical beam according to wavelength indo individual wavelength optical beams; directing each wavelength to a separate cell of a polarization modulator array, wherein each cell is selectively activated to change the polarization orientation of an optical beam passing through the cell; merging the separate wavelength optical beams into one or more output optical beams; and routing each wavelength of the one or more output optical beams to a particular output port based on polarization orientation. Other embodiments of this aspect include corresponding computer systems, apparatus, and computer programs recorded on one or more computer storage devices, each configured to perform the actions of the methods.

Particular embodiments of the subject matter described in this specification can be implemented so as to realize one or more of the following advantages. Group beam routing is provided in the front end of the wavelength selective switch to reduce the size of the wavelength selective switch. In particular, conventional wavelength selective switch devices provide beam routing with the polarization switching, which requires additional spacing that increases the height of the wavelength selective switch. Thus, the present wavelength selective switch provides a more compact wavelength selective switch device due to separation of the beam routing at the front end from the wavelength switching back end.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is an example Y-Z layout of a 1×2 wavelength selective switch on a port switching plane.
FIG. 1B is an example X-Z layout of the 1×2 wavelength selective switch on a wavelength dispersion plane.
FIG. 2A is an example Y-Z layout of a 1×4 wavelength selective switch on a port switching plane.
FIG. 2B is an example X-Z layout of the 1×4 wavelength selective switch on a wavelength dispersion plane.
FIG. 3A is an example Y-Z layout of a 1×8 wavelength selective switch on a port switching plane.
FIG. 3B is an example X-Z layout of the 1×8 wavelength selective switch on a wavelength dispersion plane.

DETAILED DESCRIPTION

Figure 4:
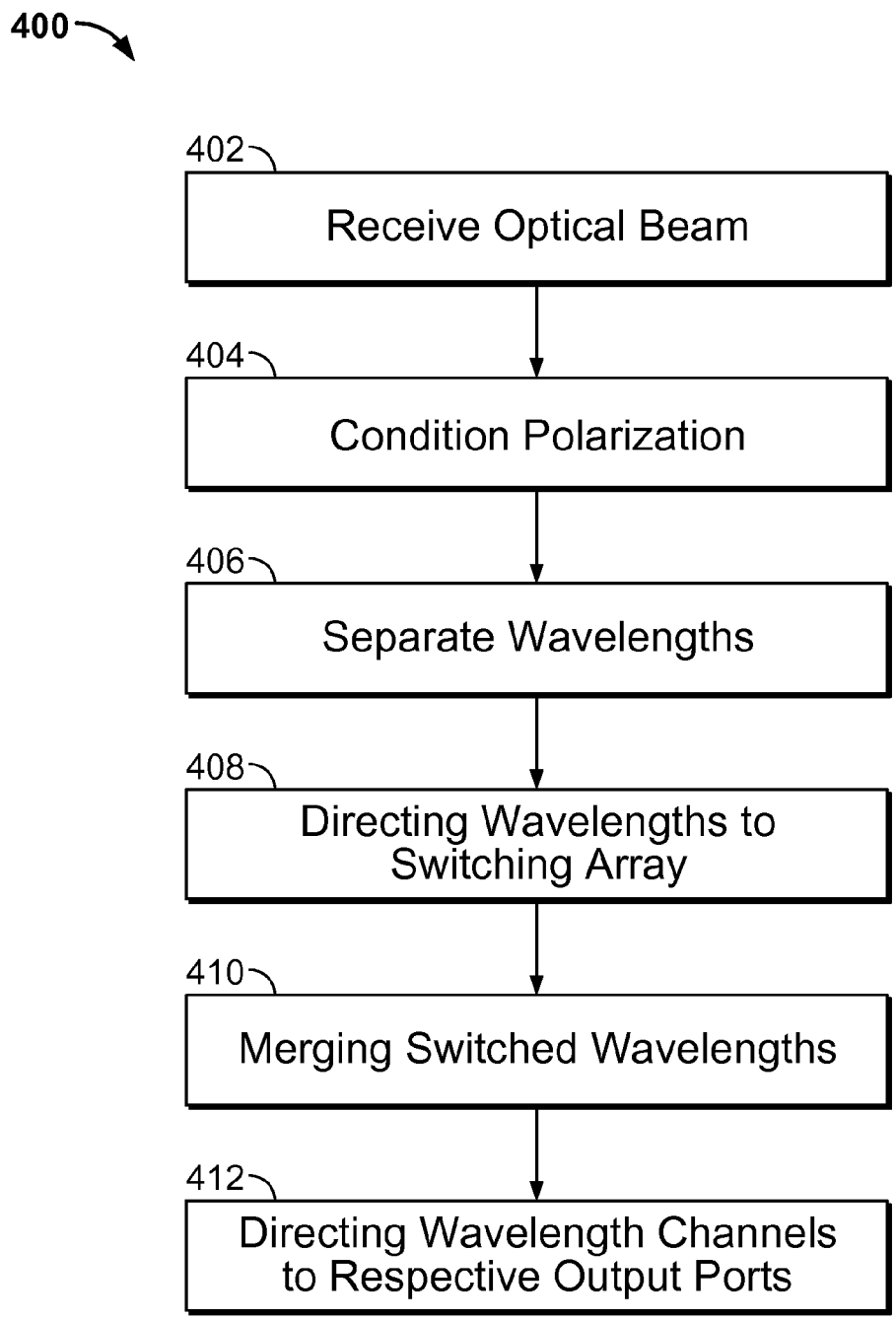
FIG. 4 is a flow diagram of an example method for wavelength selective switching.
Like reference numbers and designations in the various drawings indicate like elements.

FIG. 1A is an example Y-Z layout 101 of a 1×2 wavelength selective switch 100 on a port switching plane. FIG. 1B is an example X-Z layout 103 of the 1×2 wavelength selective switch 100 on a wavelength dispersion plane. Thus, FIG. 1A and FIG. 1B provide representations of the same wavelength selecting switch 100 from different orientations.

The wavelength selective switch 100 includes a top layer and a bottom layer for separating the input and output beam paths through the wavelength selective switch 100. The wavelength selective switch 100 includes an optical input port 102, optically coupled to the top layer, and two offset optical output ports 120 optically coupled to the bottom layer. Thus, the wavelength selective switch 100 is a 1×2 switch since it contains a single input port and two output ports. The input port 102 and output ports 120 can be respectively coupled to optical fibers, e.g., as part of an optical fiber network or one or more fiber devices.

The wavelength selective switch 100 includes a walk off crystal 104, half wave plate 105, beam expander 106, polarization beam splitter 108, optical wavelength dispersion element (e.g., grating) 110, focusing lens 112, focusing lens 114, folding optics 116, and polarization modulator array (e.g., liquid crystal cell array) 118. For clarity, each of these components will be described with respect to the path of light from the input port 102 through the wavelength selective switch 100, and to respective output ports 120. However, in some alternative implementations, the wavelength selective switch is bi-directional such that the wavelength selective switch 100 becomes a 2×1 switch having two input ports and 1 output port.

An input optical beam at the input port 102 can include multiple channels, e.g., for transmitting data. Each channel can be a wavelength channel having an optical signal having a different wavelength ($\lambda$). For example, an optical beam can be composed of individual channels having wavelengths $\lambda_1$, $\lambda_2$, $\lambda_3$, $\lambda_4$, and $\lambda_5$.

Additionally, the input optical beam can be randomly polarized. In some implementations, a polarization mode fiber input to the input port 102 provides an input optical signal having two orthogonal polarizations relative to the path of the input optical beam. However, it is typically unknown which wavelength channels have which polarization.

The randomly polarized input optical signal enters the wavelength selective switch 100 through the input port 102 and then undergoes polarization conditioning. Polarization conditioning of the input optical beam is provided by polarization conditioning components including the walk off crystal 104 and the half wave plate 105. The walk off crystal 104 is a birefringence material that decomposes the input optical signal according to polarization. In particular, the input optical signal is divided into orthogonal polarizations, each following a different path through the walk off crystal.

The half wave plate 105 rotates the polarization light output from one of the paths through the walk off crystal 104 by 90 degrees. As a result, the input optical signal leaves the polarization conditioning as two beams having identical polarization directions. Thus, the input optical beam is represented by a single known polarization. In some implementations, the polarization direction is parallel to a wavelength dispersion plane (X-Z plane) of the wavelength selective switch 100

The two light beams enter the beam expander 106 (e.g., through the top layer). The beam expander 106 can be, for example, a pair of prisms. The beam expander 106 is designed to spread out the two light beams from the polarization conditioning by a specified amount as an expanded input beam. In particular, the beam expander 106 can be designed to expand the light beams along a single axis, e.g., along the X-Z direction.

The expanded input beam passes through the polarization beam splitter 108. However, since the polarizations are the same, the polarization beam splitter 108 can be positioned such that the expanded input beam passes directly through the polarization beam splitter 108. In some alternative implementations, the polarization beam splitter 108 is only present in the bottom layer of the wavelength selective switch 100 such that the expanded input beam does not pass through the polarization beam splitter 108 along the path of the top layer.

The expanded input beam is then projected onto the optical wavelength dispersion element 110. For example, the optical wavelength dispersion element 110 can be a grating.

The grating separates the expanded input beam according to wavelength such that each wavelength follows a distinct path (e.g., a particular angle from the grating). The grating can be a diffraction grating that splits and diffracts light into several beams travelling in different directions. The directions of these beams depend on the spacing of the grating and the wavelength of the light so that the grating acts as the dispersive element separating the different wavelength channels of the expanded optical beam.

Optical components including a focusing lens 112 focuses the wavelength channels along a first axis and the focusing lens 114 focuses the wavelength channels along a second axis. In particular, focusing lens 112 is one of a pair of cylindrical lenses placed on the plane perpendicular to the plane of wavelength dispersion. Focusing lens 114 is a cylindrical lens for the beam focusing on the wavelength dispersion plane and positioned such that the grating 110 is located at a front focus plane of the focusing lens 114. Alternatively, the focusing lenses 112 and 114 can use spherical or other types of lenses instead of cylindrical lenses.

The result of the focusing lenses 112 and 114 is to map the different wavelength channels into different locations in space at a focus plane of the focusing lens 114. Beam folding optics 116 are provided such that the same optical components can be shared along a return path through the wavelength selective switch to the output ports 120.

The polarization modulator array 118 is positioned at the focus plane of optical components including the focusing lens 114. The polarization modulator array 118 can be a liquid crystal cell array that includes a number of separate polarizing modulation cells e.g., pixel cells. Each pixel can be independently controlled such that the pixel either rotates the polarization orientation of light incident on the pixel (e.g., by 90 degrees) or does not change the polarization. For example, electric voltage though a particular cell can cause alignment of the liquid crystal. Whether polarization is rotated or not can depend on whether the liquid crystal is aligned. In addition to a liquid crystal array, the polarization modulator array 118 can also be a thin film transistor liquid crystal panel or a liquid crystal on silicon.

Each polarizing modulation cell of the polarization modulator array 118 can be designed to provide polarization control for a specific wavelength channel. As such, the polarization modulator array 118 can be configured to independent control the polarization state of each individual wavelength channel according to the desired combination of wavelengths at each polarization state/orientation. For example, for a particular desired routing of wavelength channels, the polarization modulator array 118 can be programmed to produce particular polarizations of the wavelengths in order to achieve the desired port routing by the polarization beam splitter as described below.

The polarization switched wavelengths are returned through the focusing lenses 114 and 112 as well as wavelength dispersion element 110, but at the bottom layer of the wavelength selective switch 100 using the folding optics 116. The light beam with different wavelengths and switched polarization is recombined into a single beam along the same beam path after the grating 110, since the dispersion is cancelled out by the return trip through the grating 100. However, the different wavelengths in the polarization switched beam have a polarization coded by the corresponding back end liquid crystal cell pixel. Thus, the polarization switched beam can include wavelengths having different orthogonal polarizations. In some implementations, separate components are present in the return path, e.g., a separate wavelength dispersion element at the bottom layer for recombining the light beams.

The wavelength switched beam enters the polarization beam splitter 108. The polarization beam splitter 108 is positioned at a front end of the wavelength selective switch and routes the wavelength channels into different output beam paths based on their polarization state. In particular, a polarization beam splitter separates an incident beam into two beams of differing linear polarization which follow different paths through the polarization beam splitter. The polarization bema splitter can be, for example, a thin film coated polarization selective prism, a birefringence crystal walk off block, or a birefringence crystal prism.

For example, the polarization switched beam can include five wavelength channels. Based on the particular configuration of the liquid crystal cell array 118, wavelength channels $\lambda_1$, $\lambda_3$, and $\lambda_4$ can have a first polarization and wavelength channels $\lambda_2$ and $\lambda_5$ can have a second, orthogonal, polarization. The polarization beam splitter 108 splits wavelength channels $\lambda_1$, $\lambda_3$, and $\lambda_4$ to a first output beam path and wavelength channels $\lambda_2$ and $\lambda_5$ to a second output beam path. Consequently, the polarization beam splitter 108 provides port routing for an optical beam having different switched polarization components (e.g., different wavelength channels having different polarization). The port routing is performed separate from the liquid crystal switching core on a recombined switched optical beam.

Light from each output beam path passes through the beam expander 106 to reverse the prior expansion of the input optical beam, e.g., to convert the light size back to a size for output through an optical fiber. The light from the output beam paths then pass again through polarization conditioning optics to combine each respective beam for passing through a particular output port 120.

Consequently, a single input beam having five different wavelength channels has be separated such that a first output port receives wavelength channels $\lambda_1$, $\lambda_3$, and $\lambda_4$ and the second output port receives wavelength channels $\lambda_2$ and $\lambda_5$.

In some alternative implementations, the polarization modulator array 118 rotates the polarization of light incident on a particular pixel by +/−45 degrees instead of 0 degrees or 90 degrees. As a result, the polarization beam splitter 108 will send half of the corresponding light along each path. Consequently, the wavelength selective switch 100 can be used as a splitter that separates an incoming light beam having multiple channels into two separate light beams having equal amounts of each of the multiple channels.

In some alternative implementations, a linear wavelength selective switch is provided such that beam folding optics 116 are not necessary. Thus, the input port can be at one side of the wavelength selective switch and the output ports can be on an opposite side. A transmissive liquid crystal cell array can pass switched wavelengths from an input side to an output side. The polarization beam splitter need only be present on the output side in order to provide port routing for the output switched wavelengths. Other components can be duplicated on the input and output sides of the liquid crystal cell array (e.g., two optical wavelength dispersion elements, one on each side).

FIG. 2A is an example Y-Z layout 201 of a 1×4 wavelength selective switch 200 on a port switching plane. FIG. 2B is an example X-Z layout 203 of the 1×4 wavelength selective switch 200 on a wavelength dispersion plane. Thus, FIG. 2A and FIG. 2B provide representations of the same wavelength selecting switch 200 from different orientations.

The wavelength selective switch 200 includes a top layer, a middle layer, and a bottom layer for separating the input and output beam paths through the wavelength selective switch 200. In particular, on the Y-Z port switching plane an optical input port 202 is optically coupled to the top layer, two optical output ports 220 are optically coupled to the middle layer the beams of these two output ports are overlapped in space but with orthogonal polarizations. Two other offset optical output ports 220 are optically coupled to the bottom layer. Thus, there are two offset beams for each port in the region between input and output polarization conditioning optics (e.g., walk off crystal 204). After polarization beam splitter 208, the two overlapped beams in the middle layer (Y-Z plane) are routed into two different paths offset along the wavelength dispersion X-Z plane, based on their polarization states. Similarly, the two overlapped beams in the bottom layer (Y-Z plane) are routed into two different paths offset along the wavelength dispersion X-Z plane, based on their polarization states. Thus, the wavelength selective switch 200 is a 1×4 switch since it contains a single input port and two output ports on the middle layer and two output ports on the bottom layer. The input port 202 and output ports 220 can be coupled to respective optical fibers. However, in some alternative implementations as noted above, the wavelength selective switch is bi-directional such that the wavelength selective switch 200 becomes a 4×1 switch having four input ports and one output port.

The wavelength selective switch 200 includes a walk off crystal 204, half wave plate 205, beam expander 206, polarization beam splitter 208, optical wavelength dispersion element (e.g., grating) 210, focusing lens 212, focusing lens 214, and folding optics 216 as described above with respect to wavelength selective switch 100. However, instead of wavelength switching being performed by a single polarization modulator array, the wavelength selective switch 200 includes an additional switch pair including a birefringence prism 222 and a second polarization modulator array where the birefringence prism 222 is positioned between the polarization modulator arrays. The birefringence prism 222 can be, for example, a Wollaston prism. The Wollaston prism separates light into two orthogonal linearly polarized beams that diverge at a specified angle from each other.

Thus, different wavelengths having the same polarization are incident at different positions on the first polarization modulator array (e.g., liquid crystal cell array) 224 in a similar manner as described above with respect to wavelength selective switch 100. However, the coded polarizations for light from the first polarization modulator array 224 are separated by the birefringence prism 222 that diverge at a specified angle from each other based on their coded polarization. All p-polarized light is propagated along one specific angle, and all s-polarized light is propagated along another specific angle. All light beams that are propagated along two different angles are sent to the second polarization modulator array 226 for further polarization coding.

The second polarization modulator array (e.g., a second liquid crystal cell array) 226 again either changes or maintains the polarization of particular wavelengths depending on a particular coding for the second polarization modulator array 226. After passing through the lens 212, the beams with different specific propagation angles will be sent to different layers (middle and bottom layers) on the Y-Z port switching plane, regardless of their polarization states coded by the second polarization modulator array 226. The beam layer positions are determined by the polarization coding on the first liquid polarization modulator array 224 and birefringence prism 222. After the second polarization modulator array 226, the beams on the middle layer or bottom layer can be of different polarizations that depend on the polarization coding by the second polarization modulator array 226.

As with the wavelength selective switch 100 described above, only with distinct beam paths for each layer, the respective beam paths enter the polarization beam splitter 208 which separates both middle layer and bottom layer beams into two output beam paths that are routed to respective output ports 220 on the X-Z plane. For each of the two layers of output (middle and bottom layer) on the Y-Z plane there are two branches of output beam paths on X-Z plane.

For example, an input beam can have four different wavelength channels. The first polarization modulator array 224 can result in a first and second wavelength channels having a first polarization and a third and fourth wavelength channels having a second polarization. The light beams for the wavelength channels are then incident on the switch pair. The prism 222 directs the first and second wavelength channels having the first polarization to a first portion of the second polarization modulator array 226. The prism 222 directs the third and fourth wavelength channels having the second polarization to a second portion of the second polarization modulator array 226. The wavelengths are still separate such that each is incident on a respective pixel cell of the second liquid crystal cell array 226. In addition to a liquid crystal array, the first and second polarization modulator arrays can also be a thin film transistor liquid crystal panel or a liquid crystal on silicon, or a combination of these.

Thus, for example, the output path on the middle layer can include the first and second wavelength channels and the bottom layer can include the third and fourth wavelength channels. Additionally, the first and second wavelength channels can have different polarizations and the third and fourth wavelength channels can have different polarizations. Consequently, the polarization beam splitter can direct the first, second, third, and fourth wavelength channels to separate output paths optically coupled to respective output ports 220.

The input optical signal can include additional wavelengths and based on the coding of the two polarization modulator arrays, various combinations of wavelength channels can be switched to each of the individual output ports.

FIG. 3A is an example Y-Z layout 301 of a 1×8 wavelength selective switch 300 on a port switching plane. FIG. 3B is an example X-Z layout 303 of the 1×8 wavelength selective switch 300 on a wavelength dispersion plane. Thus, FIG. 3A and FIG. 3B provide representations of the same wavelength selecting switch 300 from different orientations.

The wavelength selective switch 300 includes a top layer, and four output layers for separating the input and output beam paths through the wavelength selective switch 300. For both input and any output layers, there are two offset beam paths representing two possible beams paths after the polarization conditioning optics for a random polarized input beam from the fiber. In particular, an optical input port 302 is optically coupled to the top layer, two offset optical output ports 320 are optically coupled to a first output layer, two optical output ports 320 are optically coupled to a second output layer, two optical output ports 320, overlapped in space but with orthogonal polarization, are optically coupled to a third output layer, and two optical output ports 320, overlapped in space but with orthogonal polarization, are optically coupled to a fourth output layer. Again the overlapped output ports on each output layers on Y-Z port switching plane will be separated on X-Z dispersion plane after the polarization a beam splitter 308.

Thus, the wavelength selective switch 300 is a 1×8 switch since it contains a single input port and eight output ports. The input port 302 and output ports 320 can be coupled to respective optical fibers. As discussed above, the wavelength selective switch is bi-directional such that the wavelength selective switch 100 becomes an 8×1 switch having eight input ports and 1 output port.

The wavelength selective switch 300 includes a walk off crystal 304, half wave plate 305, beam expander 306, polarization beam splitter 308, optical wavelength dispersion element (e.g., grating) 310, focusing lens 312, focusing lens 314, and folding optics 316 as described above with respect to wavelength selective switch 100.

However, instead of wavelength switching being performed by a single polarization modulator array, the wavelength selective switch 300 further includes two switch pairs including respective birefringence prisms and polarization modulator arrays. The first switch pair includes a first birefringence prism 322 positioned between a first polarization modulator array 324 and a second polarization modulator array 326. Additionally, the second switch pair includes a second birefringence prism 328 positioned between the second polarization modulator array 326 and a third polarization modulator array 330. The birefringence prisms 322 and 328 can be, for example, Wollaston prisms.

The switching provided by the combination of polarization modulator arrays (e.g., liquid crystal cell arrays) and birefringence prisms is similar to that described with respect to wavelength selective switch 200, only with an additional layer of components. The combination of polarization modulator array (324 and 326) and birefringence prisms (322 and 328) can provide light directed to light paths of the four output layers based on the polarization coding for each wavelength channel on polarization modulator array 324 and 326. Based on polarization differences coded for each wavelength on polarization modulator array 330, the two space-overlapped output ports on each output layer will be further separated on X-Z dispersion plane after the polarization beam splitter 308. Moreover, the structure can be further expanded with additional switch pairs to facilitate 1×n (or n×1) wavelength selective switching. In particular, the number of output optical ports or number of input optical ports N can depend on the number of switch pairs M such that $N=2^{(M+1)}$. For example, if there are 3 switch pairs, the maximum switch that can be achieved is 1×16 (or 16×1).

FIG. 4 is a flow diagram of an example method 400 for wavelength selective switching.

An optical beam is received (402). The optical beam includes a plurality of wavelengths (e.g., multiple wavelength channels each encoded with different information). Additionally, the optical beam is polarized in different directions. In some implementations, the optical beam is randomly polarized based on the type of optical fiber providing the optical beam.

The received optical beam is conditioned to provide uniform polarization (404). For example, a combination of a birefringence walk off plate and a half wave plate can be used to convert the received optical beam into a single polarization orientation. Other components that can be used for polarization conditioning include a polarization beam splitter and half wave plate or a birefringence prism and a half wave plate.

The uniformly polarized optical beam is separated according to wavelength (406) using wavelength dispersion optics. For example, the separation can include using a grating that passes the incident light in different dispersed directions based on wavelength. In some implementations, the separation includes first expanding the uniformly polarized optical beam to spread the beam over a larger area.

Each separated wavelengths is directed (e.g., using one or more lenses) to a particular cell of switching components (408). In particular, a grating can provide angular separation of wavelengths while the one or more lenses convert the angular separation into spatial separation on a focus plane of a first component of the switching array. For example, the switching components can include a first polarization modulator array having a multiple polarization modulation cells and one or more switch pairs depending on the configuration of the wavelength selective switch. Each polarization modulation cell can be independently controlled to either rotate the polarization orientation (e.g., by 90 degrees) of light incident on the cell or to maintain the polarization orientation. In some implementations, each cell is a pixel of a liquid crystal cell array that can be configured provide different polarization orientations for specific wavelengths of light. For additional switching, one or more switch pairs can be provided as described above.

The output light from the switching array is merged into one or more output optical beams (410). For example, the output light from the switching array can follow a reverse path through the grating in order to recombine the wavelengths to an output beam path.

Each wavelength channel of the one or more output optical beams is routed to a particular output port based on the corresponding polarization orientation (412). For example, a polarization beam splitter can provide port routing by directing wavelength channels to different output ports based on polarization. For example, in a 1×2 wavelengths selective switch, wavelength channels having a first polarization orientation can be directed to a first output path optically coupled to a first output port and wavelength channels having a second polarization orientation can be directed to a second output path optically coupled to a second output port.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A wavelength selective switch comprising:
   one or more optical input ports configured to receive one or more input optical beams, the one or more input optical beams having a plurality of wavelength channels;
   one or more optical output ports, of the one or more output optical ports being configured to receive one or more wavelength channels of the plurality of wavelength channels;
   a first optical wavelength dispersion element configured to separate the plurality of wavelength channels of the one or more input optical beams;
   a second optical wavelength dispersion element configured to combine two or more separate optical beams each having one or more different wavelengths, into a combined beam having the plurality of wavelength channels;
   a polarization modulator array having a plurality of polarizing modulation cells, each cell configured to independently change a polarization orientation of an optical beam passing through the cell;
   one or more optical components for directing optical beams corresponding to respective wavelength channels to different polarizing modulation cells;
   a polarization beam splitter configured to route received optical beams with different polarization to particular output paths; and
   one or more switch pairs, each switch pair including a second polarization modulator array and a birefringence element, each switch pair providing a separation angle between two specified polarization orientations, and wherein a number of output optical ports or a number of input optical ports N depends on the number of switch pairs M such that $N=2^{(M+1)}$.

2. The wavelength selective switch of claim 1, wherein the polarization beam splitter is positioned between the second optical wavelength dispersion element and the one or more optical output ports.

3. The wavelength selective switch of claim 1, wherein the polarization modulator array is positioned between the first optical wavelength dispersion element and the second optical wavelength dispersion element.

4. The wavelength selective switch of claim 1, further comprising:
   polarization conditioning components configured to condition the one or more input optical beam such that the one or more input optical beam has a uniform polarization orientation.

5. The wavelength selective switch of claim 1, further comprising one or more beam expanding components positioned between the one or more optical input ports and the first optical wavelength dispersion element.

6. The wavelength selective switch of claim 1, wherein the polarization modulator array is a liquid crystal cell array.

7. The wavelength selective switch of claim 1, wherein the polarization modulator array is a thin film transistor liquid crystal panel or a liquid crystal on silicon.

8. The wavelength selective switch of claim 1, wherein the one or more optical components include one or more focusing lenses positioned between the first optical wavelength dispersion element and the polarization modulator array, wherein at least one of the one or more focusing lenses focuses the particular wavelengths on respective pixels of the polarization modulator array.

9. The wavelength selective switch of claim 1, wherein the polarization beam splitter is a thin film coated polarization selective prism, birefringence crystal walk off block, or birefringence crystal prism.

10. The wavelength selective switch of claim 1, further comprising one or more beam expanding component positioned between the one or more optical input ports and the first optical wavelength dispersion element.

11. The wavelength selective switch of claim 1, wherein the wavelength selective switch is a 1×2 switch having 1 optical input port and two optical output ports.

12. The wavelength selective switch of claim 1, wherein the wavelength selective switch is a 1×n switch having 1 optical input port and n optical output ports.

13. The wavelength selective switch of claim 1, wherein the wavelength selective switch is a 2×1 switch having 2 optical input ports and 1 optical output port.

14. The wavelength selective switch of claim 1, wherein the wavelength selective switch is an n×1 switch having n input optical ports and 1 output optical port.

15. The wavelength selective switch of claim 1, wherein the polarization modulator array is positioned at a back end of the wavelength selective switch and the polarization beam splitter is positioned at a front end of the wavelength selective switch.

* * * * *